(12) United States Patent
Fiori

(10) Patent No.: US 8,516,953 B2
(45) Date of Patent: Aug. 27, 2013

(54) CONVECTED-AIR CABINET

(76) Inventor: Mark Victor Fiori, Jandakot (AU)

( * ) Notice: Subject to any disclaimer, the term of this patent is extended or adjusted under 35 U.S.C. 154(b) by 638 days.

(21) Appl. No.: 12/671,864

(22) PCT Filed: Aug. 1, 2008

(86) PCT No.: PCT/AU2008/001111
§ 371 (c)(1),
(2), (4) Date: Feb. 2, 2010

(87) PCT Pub. No.: WO2009/018603
PCT Pub. Date: Feb. 12, 2009

(65) Prior Publication Data
US 2011/0232504 A1 Sep. 29, 2011

(30) Foreign Application Priority Data

Aug. 3, 2007 (AU) .................... 2007904172

(51) Int. Cl.
*A47J 39/00* (2006.01)
*A21B 1/24* (2006.01)

(52) U.S. Cl.
USPC ............ 99/476; 99/475; 99/467; 219/400; 126/21 A

(58) Field of Classification Search
USPC ......... 99/467, 468, 474, 475, 476; 126/21 A; 219/400, 401
See application file for complete search history.

(56) References Cited

U.S. PATENT DOCUMENTS

| | | | |
|---|---|---|---|
| 3,942,426 A | 3/1976 | Binks et al. | |
| 4,089,322 A | 5/1978 | Guibert | |
| 4,325,227 A | 4/1982 | Ibrahim | |
| 4,408,986 A * | 10/1983 | Soraya et al. | 432/6 |
| 4,750,276 A * | 6/1988 | Smith et al. | 34/612 |
| 5,069,273 A * | 12/1991 | O'Hearne | 165/206 |
| 5,228,385 A | 7/1993 | Friedrich et al. | |
| 5,913,967 A * | 6/1999 | Eisele | 99/468 |
| 6,427,761 B1 * | 8/2002 | Georges | 165/48.1 |
| 6,637,320 B2 * | 10/2003 | Grandi | 99/468 |
| 6,870,136 B1 * | 3/2005 | Majordy | 219/400 |
| 6,894,252 B2 | 5/2005 | Paller et al. | |
| 7,012,219 B2 * | 3/2006 | Kim | 219/400 |
| 8,017,889 B2 * | 9/2011 | Adamski | 219/400 |
| 2002/0100752 A1 | 8/2002 | Brenn | |

FOREIGN PATENT DOCUMENTS

| | | |
|---|---|---|
| AU | 674764 | 1/1997 |
| EP | 132475 B | 4/1991 |
| EP | 1367008 B | 12/2003 |

(Continued)

OTHER PUBLICATIONS

International Search Report, dated Aug. 29, 2008, issued in International Application No. PCT/AU2008/001111.

(Continued)

*Primary Examiner* — Reginald L Alexander
(74) *Attorney, Agent, or Firm* — Venable LLP; Robert Kinberg; Tamatane J. Aga

(57) ABSTRACT

A convected-air cabinet (10) for storage of food has fans (62, 84) for directing air from a lower part of the apparatus to an upper part. In particular there is an upper fan (84) mounted above an apertured partition (86) so that air entering through an aperture (88) in this partition (86) is directed laterally and then downwardly to provide air curtains adjacent food access means (20) at a front (16) and rear (18) of the cabinet.

8 Claims, 4 Drawing Sheets

(56) References Cited

FOREIGN PATENT DOCUMENTS

| | | |
|---|---|---|
| JP | 9053875 A | 2/1997 |
| JP | 2001197943 A | 7/2001 |
| WO | WO-97 09575 A | 3/1997 |
| WO | WO 00 36958 A | 6/2000 |
| WO | WO-2007 067173 A | 6/2007 |

OTHER PUBLICATIONS

Written Opinion of the International Searching Authority.

* cited by examiner

CONVECTED-AIR CABINET

FIELD OF THE INVENTION

The present invention relates to a convected-air cabinet

BACKGROUND OF THE INVENTION

In Australian Patent Number 674764 in the name of the present applicant there is described and claimed a Pizza and Pasta Drive-Thru Facility. It relates to a facility for preparing and storing pizza and pasta in a fresh condition for a relatively long period of time.

An important component of this facility is a means for storing the cooked food and maintaining it within a predetermined heat and moisture range. This enables the food to be prepared ahead of time and stored until purchased by a customer.

It is known that in the delivery of fast food, the food for consumption is prepared in advance of the customer's order such that it is available to them immediately. It is known that some food holding cabinets contain heating elements or heated shelves which continue to cook the food and its packaging container whilst it is being stored, rendering it unfit for consumption after some minutes. It is also known to use moisture and heat within the holding cabinets to keep food for longer periods but it is found that opening these cabinets to insert and/or remove food items causes a large degree of temperature and related humidity variation, leading to extended periods where the cabinet is not at its desired temperature and/or humidity level.

The present invention attempts to overcome at least in part the aforementioned disadvantages of previous hot food holding cabinets.

SUMMARY OF THE INVENTION

In accordance with one aspect of the present invention there is provided a convected-air cabinet characterized by comprising a front side provided with food access means, an opposed rear side provided with food access means, a base, a roof and spaced side walls interconnecting the front and rear sides, a plurality of regions within the cabinet for storage of food, wherein a first fan is mounted adjacent the base and is arranged beneath a laterally extending cover which extends from the front to the rear side but is spaced from each side, a second fan is mounted adjacent the roof and a laterally extending partition containing an aperture is mounted below the second fan, the laterally extending partition being spaced from the front and rear sides, such that air directed around the first laterally extending cover by the first fan is conveyed within the cabinet to the aperture in the second laterally extending cover and is then directed laterally by the second fan to form air curtains extending downwardly across the front and rear sides.

BRIEF DESCRIPTION OF THE DRAWINGS

The present invention will now be described, by way of example, with reference to the accompanying drawings, in which.

DESCRIPTION OF THE INVENTION

Figure 1:
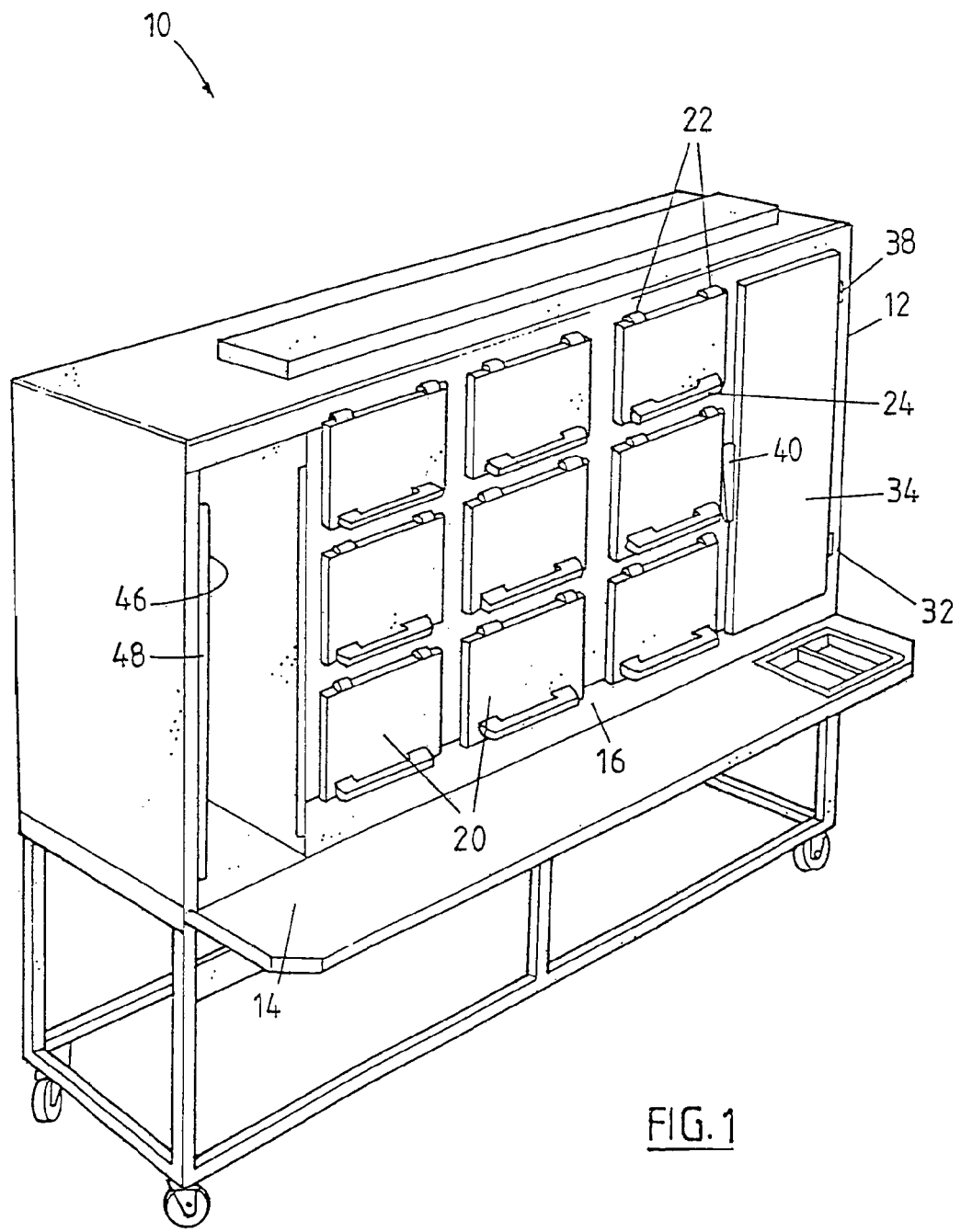
FIG. 1 is a rear isometric view of a convected-air cabinet in accordance with the present invention.
Figure 2:
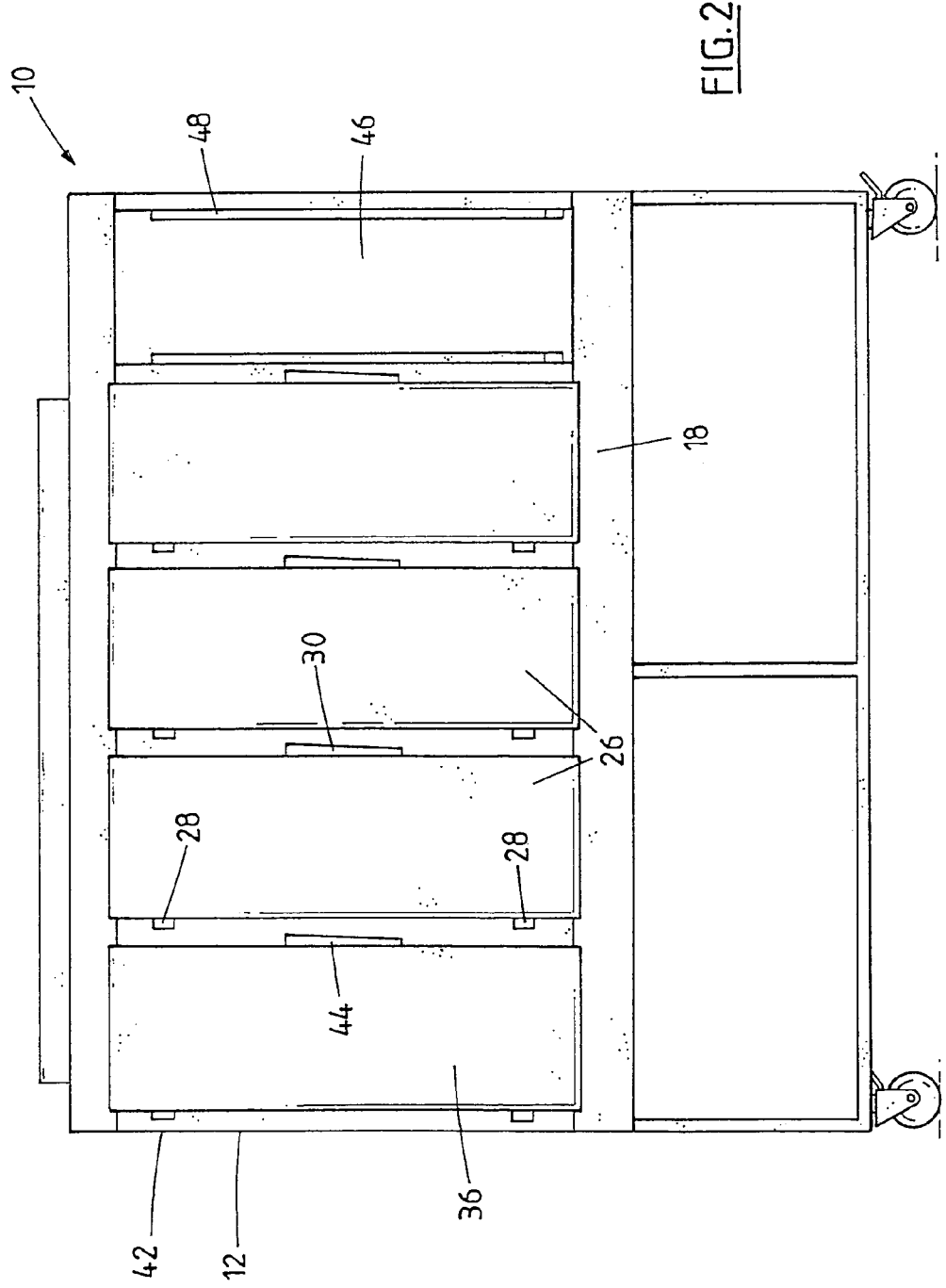
FIG. 2 is a front elevation of the convected-air cabinet of FIG. 1.

In FIGS. 1 and 2 there is shown a convected-air cabinet 10 comprising an outer body 12 having mounted thereto a food preparation shelf 14.

The body 12 has a rear side 16 (see FIG. 1) and a front side 18 (see FIG. 2). The rear side 16 is provided with a plurality of doors 20 in a central portion thereof.

The doors 20 are hingedly mounted by means of respective pairs of upper hinges 22 and are provided with respective handles 24 to enable the doors 20 to be'opened and closed as required. The hinges may be of a soft close or self-closing type.

As will be described, a respective food warming region is disposed behind each door 20.

The front side 18 is provided with a plurality of doors 26. The doors 26 are hingedly mounted on respective pairs of side hinges 28. Further, the doors 26 are provided with respective handles 30 to enable them to be opened and closed as required.

Also, the cabinet 10 further comprises a pasta warming facility 32 to one side thereof. The pasta warming facility 32 has a single rear door 34 (see FIG. 1) and a single front door 36 (see FIG. 2). The rear door 34 is mounted on a pair of side hinges 38 and may be opened and closed by means of a handle 40 as required. Similarly, the front door 36 is mounted on a pair of side hinges 42 and may be opened and closed as required by mean of a handle 44. The pasta warming facility 32 is optional depending on the user's menu.

At the end thereof, remote from the pasta warming facility, the cabinet 10 has a storage facility 46 for pizza boxes and the like. The storage facility 46 is also optional and is primarily suited to a mobile kiosk facility.

The storage facility 46 may be provided with elongate members 48 on sides thereof to cover a portion of the front and back of the storage facility 46. This is to ensure that a single stored item, such as a pizza box, may be removed at a time.

Figure 3:
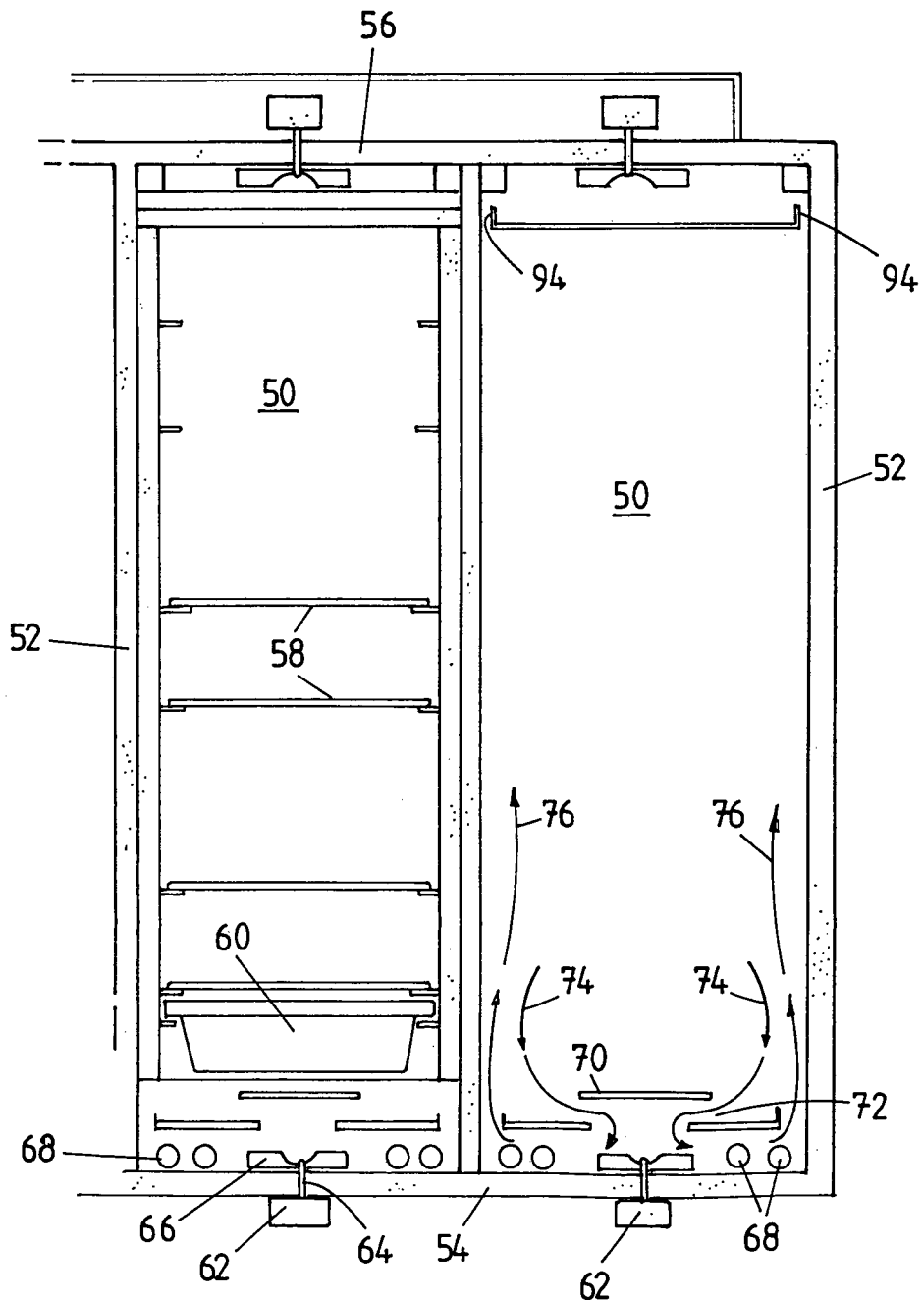
FIG. 3 is a schematic transverse sectional view of part of the convected-air cabinet of FIG. 1.

In FIG. 3, there is shown in cross section a pair of food warming regions or compartments 50 in side by side relationship forming part of the apparatus of FIGS. 1 and 2.

As can be seen in FIG. 3, each compartment 50 has side walls 52, a base 54 and a roof 56. As shown on the left each compartment 50 contains a plurality of shelves 58 which are air permeable. For example the shelves 58 may be formed of metallic mesh. The shelves 58 are arranged to support items of food. Further, as shown on the left, each compartment 50 contains a basin 60 which, in use, contains water.

Further, a respective fan 62 is mounted to the base 54 at each compartment 50. The fans 62 have drive shafts 64 arranged for axial rotation and a fan blade 66 above the base 54. Each drive shaft 64 extends through the base 54 for operational connection to the fan blade 66.

Further, electrical heating elements 68 are disposed on each side of each fan blade 66.

Each food warming compartment 50 may contain a thermometer, a humidity probe, and a thermostat, so that temperature and humidity may be controlled at desired levels.

A cover 70 is mounted above the fan blade 66 to retain heat from the elements 68 in the region of the fan blade 66. Further the cover 70 contains an aperture 72 to allow the ingress of air to the fan blade 66. As shown, air is drawn in as indicated by arrows 74.

Further, heated air is expelled by the fan blade 66 around the periphery of the cover 70 into the chamber 50 as indicated by arrows 76.

Figure 4:
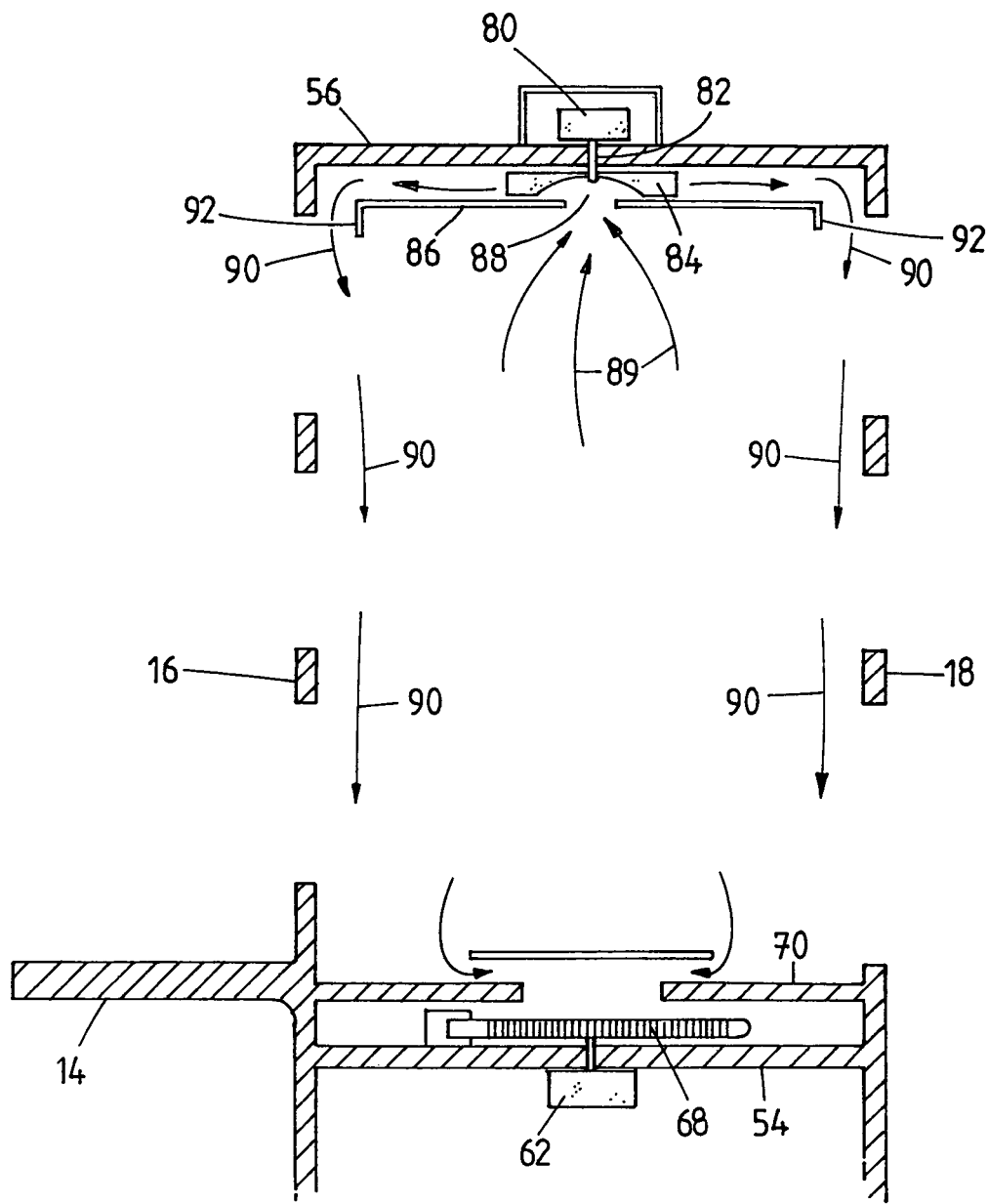
FIG. 4 is a schematic longitudinal sectional view of part of the convected-air cabinet of FIG. 1.

As can be seen in FIG. 4, each compartment 50 has a further fan 80 mounted at the top thereof. The fan 80 has an axially rotatable drive shaft 82 extending through the roof 56. The shaft 82 is connected to a fan blade 84.

Further, a partition 86 is mounted below the fan blade 84. The partition 86 is spaced from the roof 56 and has a central aperture 88 therein adjacent the fan blade 64. Further, the partition 86 extends laterally away from the fan blade 84 to positions close to the front side 18 and the rear side 16 of the cabinet 10. In use, heated air from the compartment 50 is drawn by the fan blade 84 through the aperture 88 as indicated by arrows 89 and then blown laterally as shown by arrows 90 along the roof 56 to the end of the partition 86 adjacent the front side 18 and the rear side 16. The partition 86 has downturned peripheral flanges 92 adjacent the sides 18 and 16 and upturned peripheral flanges 94 adjacent the side walls 52.

The air then is directed downwardly along the front and rear sides 18 and 16. In this way the air from the fan blade 84 produces an air curtain adjacent the doors 20 and 26. Thus when the doors are opened as described hereinbefore to place food on the shelves or remove food therefrom the overall internal temperature and humidity of the compartment 50 is maintained close to the desired levels so as to reduce food spoilage.

Further, it is noted that the presence of the basins 60, with water therein, ensures that the heated air distributed into the compartments 50 have a substantial moisture content. This is important as it removes any tendency of the stored food to dry out. Further, the heating elements 68 are preferably arranged such that whilst the air is heated it is not heated to a temperature sufficient to cause further cooking of the stored food.

The cabinet of the present invention is particularly intended for use in the hospitality industry, fast food outlets, mobile kiosks, transportable kitchens and truck semi-trailer applications.

As shown, the cabinet of the present invention may be made to have a large size with a number of compartments 50 so as to be able to supply customer needs continuously even at peak sales periods.

The cabinet of the present invention is particularly intended for storage of cooked pizza but it is applicable to storage of foods such as pasta, as described above.

Modifications and variations as would be apparent to a skilled addressee are deemed to be within the scope of the present invention.

The invention claimed is:

1. A convected-air food storage cabinet comprising:
a front side provided with food access means,
an opposed rear side provided with food access means,
a base, a roof and spaced side walls interconnecting the front and rear sides,
a plurality of food storage regions within the cabinet,
a laterally extending cover extending from and attached laterally to the front and rear sides and spaced from each side wall,
a first fan mounted adjacent the base and arranged beneath and adjacent to the laterally extending cover, the laterally extending cover including a substantially central aperture to allow for ingress of air to the first fan,
a second fan mounted adjacent the roof, and
a laterally extending partition containing a substantially central aperture mounted below and adjacent to the second fan, the laterally extending partition being spaced from the front and rear sides, wherein air directed around the laterally extending cover by the first fan is conveyed upwardly within the cabinet initially along the side walls and subsequently to the central aperture in the laterally extending partition and is then directed laterally along the roof by the second fan and subsequently downwardly across the front and rear sides to form air curtains extending downwardly across the front and rear sides.

2. A convected-air food storage cabinet according to claim 1, further comprising an air heater located adjacent the first fan to heat air directed laterally by the first fan.

3. A convected-air food storage cabinet according to claim 1, wherein the aperture in the laterally extending partition is disposed adjacent the second fan.

4. A convected-air food storage cabinet according to claim 3, wherein the laterally extending partition has downwardly turned peripheral flanges adjacent the front and rear sides.

5. A convected-air food storage cabinet according to claim 4, wherein the laterally extending partition includes upwardly turned peripheral flanges adjacent the side walls.

6. A convected-air food storage cabinet according to claim 1, wherein the cabinet includes a basin arranged to contain water, in use, so as to humidify air in the cabinet.

7. A convected-air food storage cabinet according to claim 1, wherein the front and rear sides include doors arranged to be opened and closed to permit loading and unloading of food to and from the cabinet.

8. A convected-air food storage cabinet according to claim 1, wherein the cabinet includes a plurality of substantially horizontally disposed air permeable shelves arranged to support items of food.

* * * * *